United States Patent [19]
Shimura

[11] Patent Number: 5,490,164
[45] Date of Patent: Feb. 6, 1996

[54] APPARATUS FOR CLASSIFYING AND STORING CONNECTION COEFFICIENTS FOR A MULTI-LAYER NEURAL NETWORK

[75] Inventor: Kazuo Shimura, Kanagawa, Japan

[73] Assignee: Fuji Photo Film Co., Ltd., Kanagawa, Japan

[21] Appl. No.: 868,966

[22] Filed: Apr. 18, 1991

[30] Foreign Application Priority Data

Apr. 19, 1990 [JP] Japan ................................. 2-103394

[51] Int. Cl.$^6$ ............................ G06F 15/18; G03B 42/02
[52] U.S. Cl. ................................................ 395/22; 395/24
[58] Field of Search ................................ 395/22, 23, 21, 395/24

[56] References Cited

U.S. PATENT DOCUMENTS

| | | | |
|---|---|---|---|
| 4,912,649 | 3/1990 | Wood | 364/513 |
| 5,195,169 | 3/1993 | Kamiya et al. | 395/23 |

OTHER PUBLICATIONS

Sietsma et al., "Neural Net Pruning–Why and How", IEEE Intl. Conf. Neural Networks, Jul. 1988, I, 325–333.
Karnin, E. D., "A Simple Procedure for Pruning Back–Propagation Trained Neural Networks", IEEE Trans. Neural Networks, Jun. 1990, 239–242.
Montana et al., "Training Feedforward Neural Networks Using Genetic Algorithms", IJCAI–89, Aug. 1989, 762–767.
McClelland et al., Explorations in Parallel Distributed Processing, MIT Press., 1988, pp. 1–3, 121–150.
Mozer et al., "Skeletonization: A Technique for Trimming The Fat From a Network via Relevance Assessment", from Advances in Neural Info. Processing Systems I, 1989, pp. 107–115.
Hanson et al., "Comparing Biases for Minimal Network Construction with Back–Propagation", from Advances in Neural Info. Processing Systems I, 1989, pp. 177–185.
Baum, E. B., "On the Capabilities of Multilayer Perceptions", Jour. of Complexity 4, 1988, 193–215.
Fresler, et al., "A Weight Discretization Paradigm for Optical Neural Networks", SPIE vol. 1281 Optical Interconnections and Networks, 1990, Mar. 164–173.

*Primary Examiner*—Robert W. Downs
*Attorney, Agent, or Firm*—Sughrue, Mion, Zinn, Macpeak & Seas

[57] ABSTRACT

An apparatus for storing weight coefficients for a multi-layer neural network is disclosed, wherein information representing connection coefficients is stored which represent strengths of connections between neurons of a multi-layer neural network constituted of an input layer, an intermediate layer, and an output layer, each of the input layer, the intermediate layer, and the output layer being composed of at least a single neuron. The apparatus for storing weight coefficients for a multi-layer neural network is provided with a device for classifying connections, which classifies the connections as having a high degree of connection or having a low degree of connection by comparing the connection coefficients with a predetermined threshold value, and which classifies the connections on the input side of each of the neurons as having a low degree of connection in cases where all of the connections on the output side of each said neuron have been classified as having a low degree of connection, and a storage device for storing information representing the connection coefficients of the connections, which have been classified as having a high degree of connection, and information concerning the corresponding table, which indicates whether the connections between the neurons have been classified as having a high degree of connection or having a low degree of connection by the device for classifying connections.

1 Claim, 3 Drawing Sheets

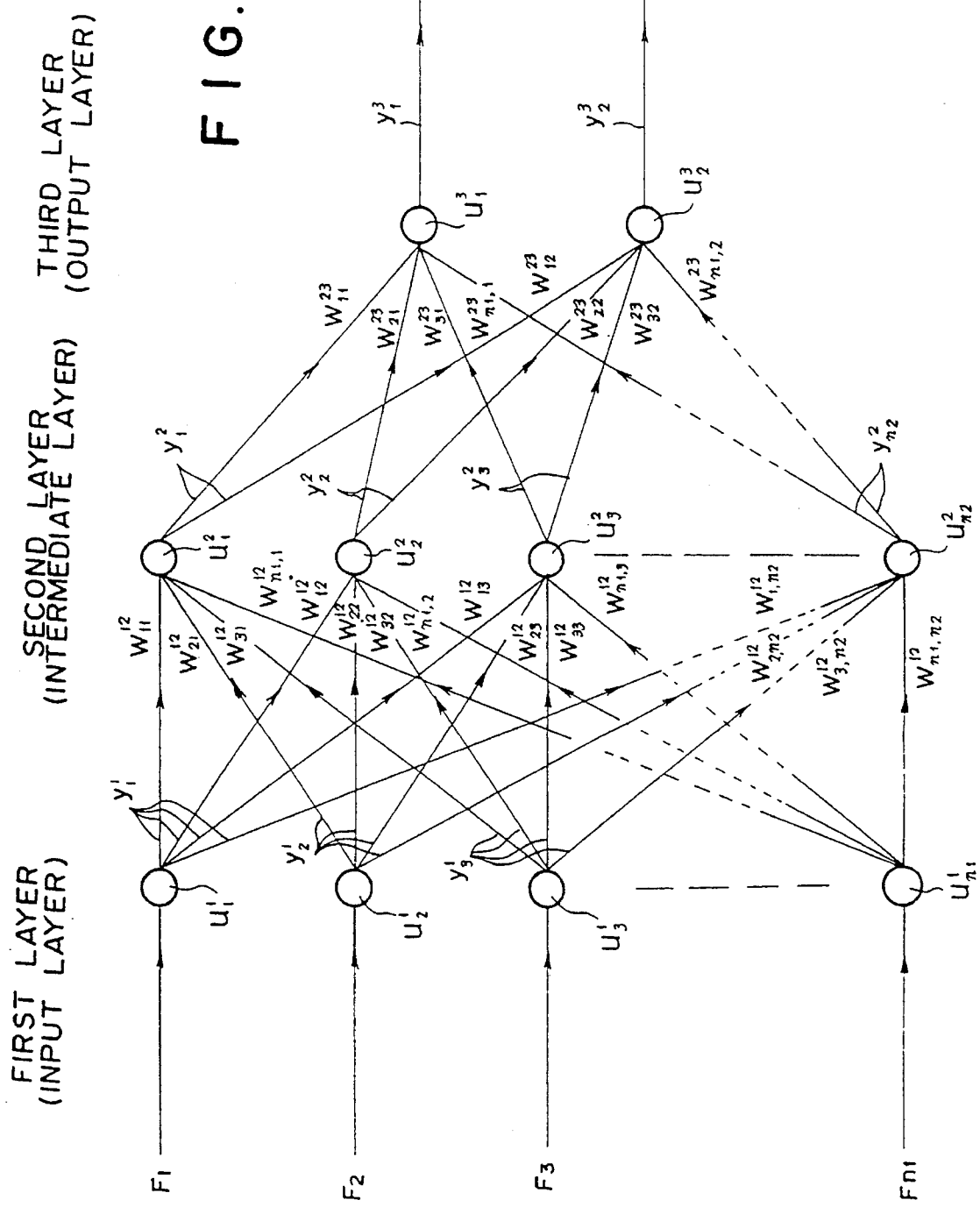

APPARATUS FOR CLASSIFYING AND STORING CONNECTION COEFFICIENTS FOR A MULTI-LAYER NEURAL NETWORK

BACKGROUND OF THE INVENTION

1. Field of the Invention

This invention relates to an apparatus for storing information representing factors for a multi-layer neural network, which represent weights of connections between a plurality of neurons constituting a multi-layer neural network provided with a learning function by a back propagation method.

2. Description of the Prior Art

Various intellectual data bases have heretofore been used in various fields. The intellectual data bases receive many pieces of information, analyze the information, and feed out the results of analyses of the information.

Recently, a method for utilizing a neural network has been proposed, which can be utilized as an intellectual data base and which is quite different from the intellectual data base described above.

The neural network is provided with a learning function by back propagation method. Specifically, when information (an instructor signal), which represents whether an output signal obtained when an input signal is given is or is not correct, is fed into the neural network, the weights of connections between units in the neural network (i.e. the weights of synapse connections) are corrected. By repeating the learning operations of the neural network, the probability that a correct answer will be obtained in response to a new input signal can be kept high. (Such functions are described in, for example, "Learning representations by back-propagating errors" by D. E. Rumelhart, G. E. Hinton and R. J. Williams, Nature, 323-9,533-356, 1986a; "Back-propagation" by Hideki Aso, Computrol, No. 24, pp. 53–60; and "Neural Computer" by Kazuyuki Aihara, the publishing bureau of Tokyo Denki University).

As described above, by feeding a large number of input signals into a neural network, the results of judgments can be obtained on the basis of the input signals. For such purposes, it is necessary to employ a neural network, which is provided with a large number of neurons and constituted of a large number of layers.

However, when the number of neurons increases, the number of connections between the neurons becomes very large. Therefore, a storage device having a very large storage capacity must be employed to store the information representing the weights of the connections.

By way of example, a neural network may be constituted such that it may receive image signal components of an image signal representing picture elements in an X-ray image of a human body, which is an object, and may feed out characteristic measures of the X-ray image, such as the portion of the object (e.g. the head, the neck, the chest, or the abdomen) the image of which was recorded, and the mode used when the X-ray image was recorded (e.g. an ordinary image recording mode, a tomographic image recording mode, or an enlarged image recording mode). The neural network may be constituted of three layers; i.e. an input layer, an intermediate layer, and an output layer. The input layer may be composed of 256 (=16×16) units (i.e. the number of picture elements in the X-ray image is equal to 16×16). The intermediate layer may be composed of 16 neurons, and the output layer may be composed of two neurons. Such a neural network may be employed for each of 100 characteristic measures. Also, the information representing the weight factor of each connection between the neurons may be expressed with eight bytes. In such cases, in order to store the information representing the weight factors of all connections, the storage device must have a storage capacity calculated from the formula $$(256 \times 16 + 16 \times 2) \times 100 \times 8 = 3 \text{ megabytes}$$

Thus it is necessary for a storage device having a very large capacity to be used.

SUMMARY OF THE INVENTION

The primary object of the present invention is to provide an apparatus for storing factors for a multi-layer neural network, wherein information representing factors is stored such that the storage capacity may be kept small.

Another object of the present invention is to provide an apparatus for storing factors for a multi-layer neural network, which apparatus is suitable for storing information concerning a large number of multi-layer neural networks.

The present invention provides an apparatus for storing factors for a multi-layer neural network, wherein information representing connection factors is stored which represent strengths of connections between neurons of a multi-layer neural network constituted of an input layer, at least a single intermediate layer, and an output layer, each of the input layer, the intermediate layer, and the output layer being composed of at least a single neuron, wherein the improvement comprises the provision of:

i) a means for classifying connections, which classifies said connections as having a high degree of connection or having a low degree of connection by comparing said connection factors with a predetermined threshold value, and which classifies the connections on the input side of each of the neurons as having a low degree of connection in cases where all of the connections on the output side of each said neuron have been classified as having a low degree of connection, and ii) a storage means for storing information representing the connection factors of the connections, which have been classified as having a high degree of connection, and information concerning the corresponding table, which indicates whether the connections between the neurons have been classified as having a high degree of connection or having a low degree of connection by said means for classifying connections.

The apparatus for storing factors for a multi-layer neural network in accordance with the present invention is provided with the means for classifying connections, which classifies the connections as having a high degree of connection or having a low degree of connection by comparing the connection factors with a predetermined threshold value. In cases where all of the connections on the output side of each of the neurons have been classified as having a low degree of connection, the connections on the input side of each said neuron are classified as having a low degree of connection. Therefore, only the connections having a high degree of connection can be extracted.

The apparatus for storing factors for a multi-layer neural network in accordance with the present invention is also provided with the storage means for storing information representing the connection factors of the connections, which have been classified as having a high degree of connection, and information concerning the corresponding table, which indicates whether the connections between the neurons have been classified as having a high degree of connection or having a low degree of connection by the means for classifying connections. Therefore, the storage capacity of the storage means can be kept small. Also, information concerning a large number of neural networks can be stored in an appropriately arranged form. Therefore, by using the stored information concerning a large number of neural networks, operations for obtaining desired outputs can be carried out efficiently.

BRIEF DESCRIPTION OF THE DRAWINGS

FIG. 5 is an explanatory view showing an example of a neural network.

DESCRIPTION OF THE PREFERRED EMBODIMENTS

Figure 1A:
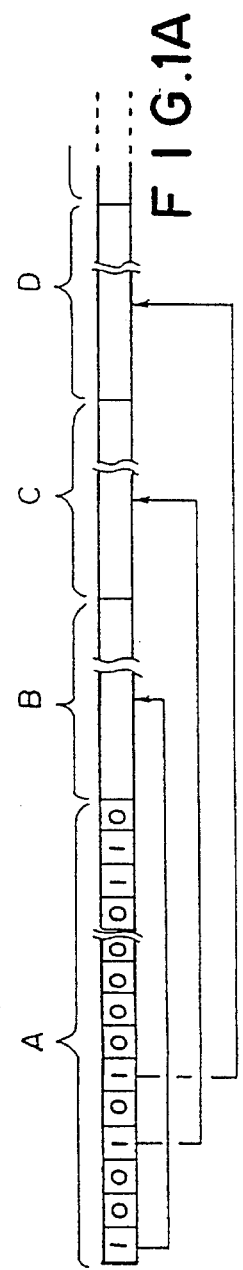
FIGS. 1A and 1B are explanatory views showing formats in which the information concerning neural networks is stored.

The present invention will hereinbelow be described in further detail with reference to the accompanying drawings.

In an embodiment described below, a stimulable phosphor sheet is used, and an X-ray image of a human body is processed.

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in Japanese Unexamined Patent Publication Nos. 55(1980)-12429, 56(1981)-11395, 55(1980)-163472, 56(1981)-104645, and 55(1980)-116340, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed. The proposed radiation image recording and reproducing systems are constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

As disclosed in, for example, Japanese Unexamined Patent Publication Nos. 60(1985)-185944 and 61(1986)-280163, operations for calculating the values of the read-out conditions for the final readout are carried out by a group of algorithms which analyze a preliminary read-out image signal. A large number of image signals detected from a large number of radiation images are statistically processed. The algorithms which calculate the read-out conditions for the final readout are designed on the basis of the results obtained from this processing.

In general, the algorithms which have heretofore been employed are designed such that a probability density function of an image signal is created, and characteristic values are found from the probability density function. The characteristic values include, for example, the maximum value of the image signal, the minimum value of the image signal, or the value of the image signal at which the probability density function is maximum, i.e. the value which occurs most frequently. The read-out conditions for the final readout are determined on the basis of the characteristic values.

In this embodiment, neural networks are prepared which determine read-out conditions for the final readout with respect to each of characteristics of images, such as the portion of the object the image of which was recorded (e.g. the head, the neck, the chest, or the abdomen) and the orientation in which the object was placed when the image of the object was recorded (e.g. a front image, a left side image, or a right side image).

Figure 2:
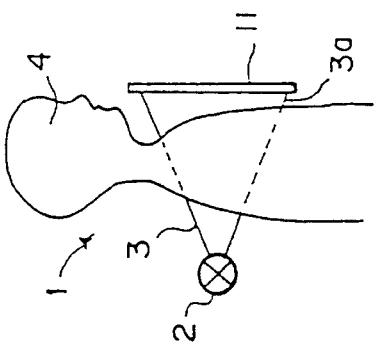
FIG. 2 is a schematic view showing an example of an X-ray image recording apparatus.

FIG. 2 is a schematic view showing an example of an X-ray image recording apparatus.

With reference to FIG. 2, X-rays 3 are produced by an X-ray source 2 of an X-ray image recording apparatus 1 and irradiated to a human body 4. X-rays 3a, which have passed through the human body 4, impinge upon a stimulable phosphor sheet 11. In this manner, an X-ray image of the human body 4 is stored on the stimulable phosphor sheet 11.

Figure 3A:
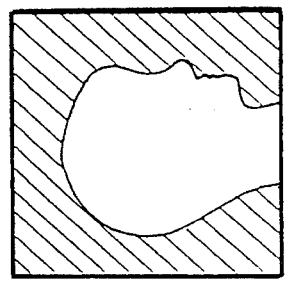
FIGS. 3A and 3B are explanatory views showing examples of X-ray images of the shoulder and the head.
Figure 3B:
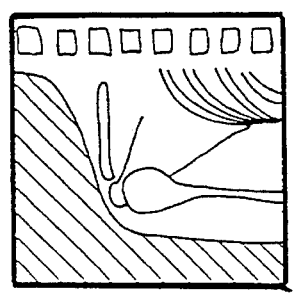

FIGS. 3A and 3B show examples of X-ray images which have been stored on stimulable phosphor sheets.

FIGS. 3A and 3B show the X-ray image of the right shoulder and the X-ray image of the side of the head. These X-ray images are mere examples, and X-ray images of various portions of objects are recorded. For example, front and side images of necks, and front images of chests are recorded.

Figure 4:
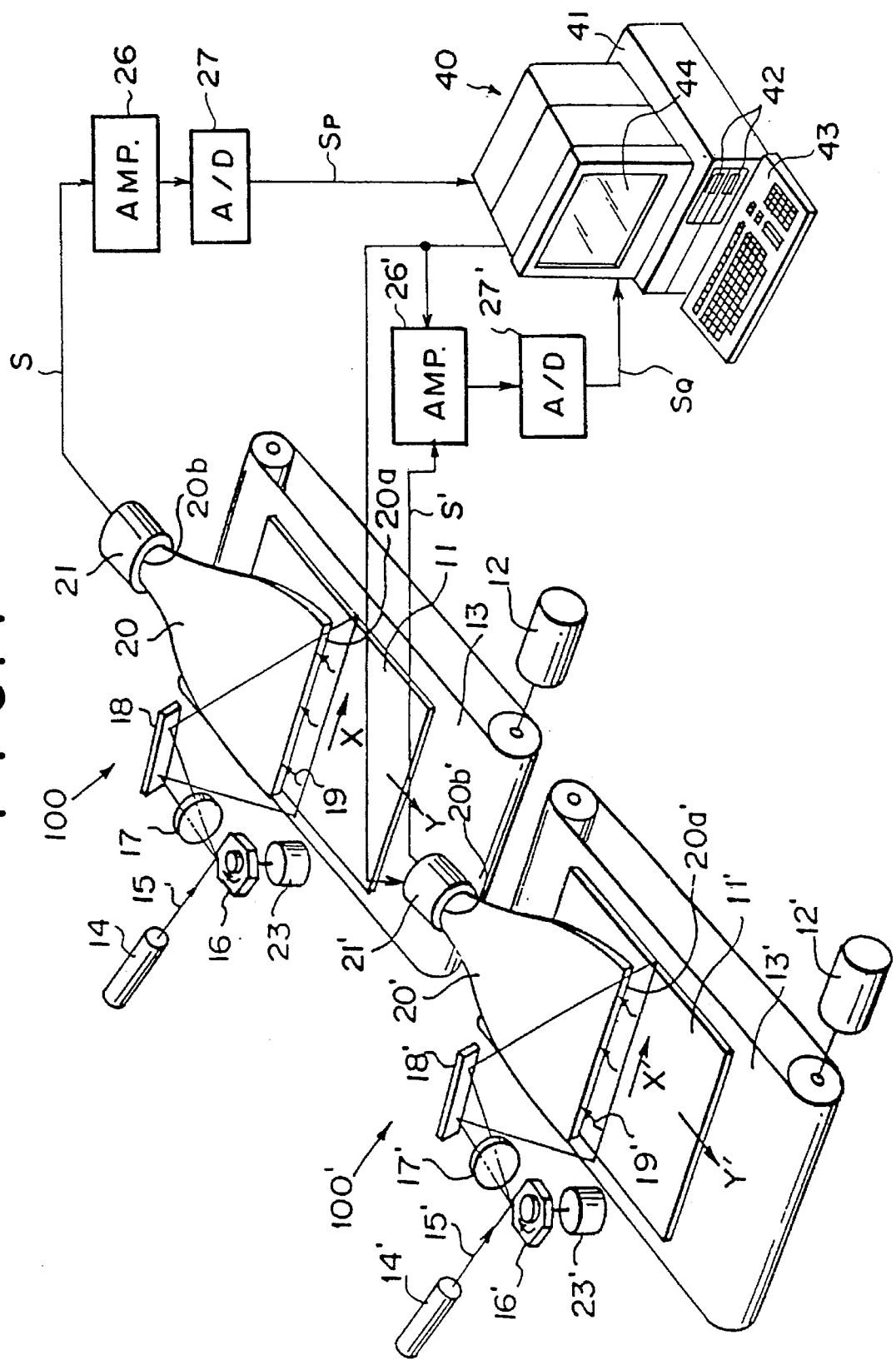
FIG. 4 is a perspective view showing an example of an X-ray image read-out apparatus and an example of a computer system, in which an embodiment of the apparatus for storing factors for a multi-layer neural network in accordance with the present invention is employed.

FIG. 4 is a perspective view showing an example of an X-ray image read-out apparatus and an example of a computer system, in which an embodiment of the apparatus for storing factors for a multi-layer neural network in accordance with the present invention is employed. In this embodiment, by way of example, a stimulable phosphor sheet is used, and a preliminary readout is carried out.

The stimulable phosphor sheet 11, on which the X-ray image has been stored, is placed at a predetermined position in a preliminary read-out means 100 which carries out a preliminary readout by scanning the stimulable phosphor sheet 11 with a light beam having a low energy level, thereby releasing only part of the energy from the stimulable phosphor sheet 11, which energy was stored during its exposure to radiation. The stimulable phosphor sheet 11 is conveyed in a sub-scanning direction indicated by the arrow Y by a sheet conveyance means 13 which is constituted of an endless belt or the like and which is operated by a motor 12. A laser beam 15 which has a low energy level is produced by a laser beam source 14, and is reflected and deflected by a rotating polygon mirror 16 which is quickly rotated by a motor 23 in the direction indicated by the arrow. The laser beam 15 then passes through a converging lens 17 constituted of an f$\theta$ lens or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20 and photoelectrically detected by a photomultiplier 21. The light guide member 20 is made from a light guiding material such as an acrylic plate and has a linear light input face 20a, positioned so that it extends along the main scanning line on the stimulable phosphor sheet 11, and a ring-shaped light output face 20b, positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which amount represents the X-ray image, is converted into an electric signal by the photomultiplier 21.

An analog output signal S generated by the photomultiplier 21 is logarithmically amplified by a logarithmic amplifier 26, and digitized by an A/D converter 27 into a preliminary read-out image signal SP. The preliminary read-out image signal SP takes a value proportional to the logarithmic value of the amount of the light 19, which was emitted from each of picture elements in the X-ray image stored on the stimulable phosphor sheet 11.

In the preliminary readout, read-out conditions, i.e. the voltage applied to the photomultiplier 21 and the amplification factor of the logarithmic amplifier 26, are adjusted so that image information can be detected accurately even if the amount of energy stored on the stimulable phosphor sheet 11 during its exposure to radiation varies over a wide range.

The preliminary read-out image signal SP obtained in the manner described above is fed into a computer system 40. The computer system 40 is provided with an embodiment of the apparatus for storing factors for a multi-layer neural network in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

Before or after the preliminary readout is carried out in the manner described above, information representing the portion of the object the X-ray image of which was recorded and has been or is to be read out during the preliminary readout is entered from the keyboard 43 into the computer system 40.

The computer system 40 stores information concerning the neural networks (or the factors representing the weights of connections of neurons constituting each neural network) for respective portions of objects the images of which were recorded. When the information representing the portion of the object the X-ray image of which was recorded and has been or is to be read out during the preliminary readout is entered from the keyboard 43 into the computer system 40, the information concerning the neural network corresponding to the designated portion of the object is read from the storage means of the computer system 40. Instead of the information representing the portion of the object the X-ray image of which was recorded being entered from the keyboard 43, a neural network may be provided which determines the portion of the object, the X-ray image of which was recorded, on the basis of the preliminary readout image signal SP obtained in the manner described above.

In the manner described above, the information concerning the neural network corresponding to the designated portion of the object is read from the storage means of the computer system 40. Thereafter, in order for the number of the points of inputs to the neural network to be reduced, the preliminary read-out image signal SP is thinned out uniformly over the whole area of the X-ray image. The preliminary read-out image signal SP, which has been thinned out, is fed into the neural network. From the received preliminary read-out image signal SP, the neural network determines the read-out conditions for the final readout, i.e. the sensitivity and the contrast during the final readout. The voltage applied to the photomultiplier 21', the amplification factor of the logarithmic amplifier 26', and the like, are controlled in accordance with the sensitivity and the contrast.

The contrast corresponds to the ratio of the largest amount of emitted light, which is capable of being accurately converted into an image signal during the final readout, to the smallest amount of emitted light, which is capable of being accurately converted into an image signal during the final readout. The sensitivity corresponds to the photoelectric conversion factor, which represents to what image signal level a predetermined amount of emitted light is to be converted.

A stimulable phosphor sheet 11' on which the preliminary readout has been finished is placed at a predetermined position in the final read-out means 100' and scanned with a laser beam 15' having an energy level higher than that of the laser beam 15 used during the preliminary readout. In this manner, an image signal is detected under the read-out conditions which have been determined on the basis of the preliminary read-out image signal. The configuration of the final read-out means 100' is nearly the same as that of the preliminary readout means 100, and therefore elements corresponding to those constituting the preliminary read-out means 100 are numbered with corresponding primed reference numerals in FIG. 6.

After the image signal is digitized in an A/D converter 27', the resulting image signal SQ is fed into the computer system 40, which carries out appropriate image processing on the image signal SQ. After being image processed, the image signal is fed into a reproducing apparatus (not shown), which reproduces a visible image from the image signal.

How the learning operations of a neural network are carried out and how the information representing the factors, which represent the weights of connections between neurons and which have been obtained as a result of the learning operations, is stored will be described hereinbelow.

FIG. 5 is an explanatory view showing an example of the neural network which is provided with a learning function by back propagation method. As described above, the term "learning function by back propagation method" as used herein means the learning algorithms in a neural network, with which the output of the neural network is compared with a correct answer (an instructor signal), and the weights of connections (i.e. the weights of synapse connections) are corrected sequentially from the output side to the input side of the neural network.

With reference to FIG. 5, the neural network comprises a first layer (an input layer), a second layer (an intermediate layer), and a third layer (an output layer). The first, second, and third layers are composed respectively of n1 number of units (neurons), n2 number of units (neurons), and two units (neurons). Signals F1, F2, . . . , Fn1 fed into the first layer (the input layer) are the image signal components of the preliminary readout image signal SP representing the picture elements in the X-ray image, which image signal components have been thinned out. Two outputs $y_1^3$ and $y_2^3$ obtained from the third layer (the output layer) are the signals corresponding to the sensitivity and the contrast during the final readout. An i'th unit of a k'th layer is indicated by $u_i^k$. The input into the unit $u_i^k$ is indicated by $x_i^k$, and the output therefrom is indicated by $y_j^{k+1}$. The weight of connection from the unit $u_i^k$ to a unit $u_j^{k+1}$ is indicated by $W_{ij}^{k\,k+1}$. Also, each unit $u_j^k$ has the same characteristic function, which is expressed as $$f(x) = \frac{1}{1-e^x} \quad (1)$$

The input $x_j^k$ into each unit $u_j^k$ and the output $y_j^k$ therefrom are expressed as $$x_j^k = \sum_i W_{ij}^{k-1\,k} \cdot y_i^{k-1} \quad (2)$$

$$y_j^k = f(x_j^k) \quad (3)$$

Inputs F1, F2, . . . , Fn1 into the units $u_i^1$, where i=1, 2, . . . , n1, which units constitute the input layer, are fed into the units $u_i^1$, where i=1, 2, . . . , n1, without being weighted. The n1 number of signals F1, F2, . . . , Fn1 are weighted with the weights of connections $W_{ij}^{k\,k+1}$, and transmitted to the ultimate outputs $y_1^3$ and $y_2^3$. In this manner, the read-out conditions for the final readout (i.e. the sensitivity and the contrast) are obtained.

How the weights of connections $W_{ij}^{k\,k+1}$ are determined will be described hereinbelow. First, initial values of the weights of connections $W_{ij}^{k\,k+1}$ are given by random numbers. The range of the random numbers should preferably be limited such that, even when the values of the inputs F1, F2, . . . , Fn1 fluctuate to the largest extent, the outputs $y_1^3$ and $y_2^3$ may take values falling within a predetermined range or values close to said predetermined range.

Thereafter, preliminary read-out image signals are obtained in the manner described above from a plurality of stimulable phosphor sheets storing X-ray images, for which the appropriate read-out conditions for the final readout are known. Each preliminary read-out image signal SP thus obtained is thinned out. In this manner, the n1 number of inputs F1, F2, . . . , Fn1 are obtained. The n1 number of inputs F1, F2, . . . , Fn1 are fed into the neural network shown in FIG. 5, and the outputs $y_i^k$ of the respective units $u_i^k$ are monitored.

After the outputs $y_i^k$ are obtained, square errors E1 and E2 between the ultimate outputs $y_1^3$, $y_2^3$ and the instructor signals (the sensitivity $\tilde{y}_1^3$ and the contrast $\tilde{y}_2^3$) representing the read-out conditions for the final readout appropriate for the image are calculated with the formulas $$E_1 = \frac{1}{2}(y_1^3 - y_2^3)^2 \qquad (4)$$

$$E_2 = \frac{1}{2}(y_2^3 - y_2^3)^2 \qquad (5)$$

The weights of connections $W_{ij}^{k\,k+1}$ are then corrected such that the square errors E1 and E2 become the smallest. The output $y_1^3$ will be described hereinbelow. The descriptions below also apply to the output $y_2^3$.

The square error E1 is a function of $W_{ij}^{k\,k+1}$. Therefore, in order for the square error E1 to be minimized, the weights of connections $W_{ij}^{k\,k+1}$ are corrected with the formula $$W_{ij}^{kk+1} = W_{ij}^{kk+1} - \eta \cdot \frac{\partial E_1}{\partial W_{ij}^{kk+1}} \qquad (6)$$

where $\eta$ denotes a coefficient, which is referred to as a learning coefficient.

The following formula obtains:

$$\frac{\partial E_1}{\partial W_{ij}^{kk}+1} = \frac{\partial E_1}{\partial x_j^{k+1}} \cdot \frac{\partial x_j^{k+1}}{\partial W_{ij}^{kk}+1} \qquad (7)$$

Also, Formula (2) gives $$x_j^{k+1} = \sum_i W_{ij}^{kk+1} \cdot y_i^k \qquad (2)'$$

Therefore, Formula (7) gives $$\frac{\partial E_1}{\partial W_{ij}^{kk+1}} = \frac{\partial E_1}{\partial x_j^{k+1}} \qquad (8)$$

From Formula (4), the following formula obtains:

$$\frac{\partial E_1}{\partial x_1^3} = (y_1^3 - \bar{y}_1^3) \cdot \frac{\partial y_1^3}{\partial x_1^3} \qquad (9)$$

Formula (9) can be changed with Formula (3) into $$\frac{\partial E_1}{\partial x_1^3} = (y_1^3 - \bar{y}_1^3) \cdot f'(x_1^3) \qquad (10)$$

From Formula (1), the following formula obtains:

$$f'(x) = f(x)(1 - f(x)) \qquad (11)$$

Therefore, $$f'(x_1^3) = y_1^3 \cdot (1 - y_1^3) \qquad (12)$$

Setting k=2 in Formula (8) and substituting Formulas (10) and (12) into Formula (8) yield $$\frac{\partial E_1}{\partial W_{ii}^{23}} = \frac{\partial E_1}{\partial x_1^3} \cdot y_i^2 = \qquad (13)$$

$$(y_1^3 - \bar{y}_1^3) \cdot y_1^3 \cdot (1 - y_1^3) \cdot y_i^2$$

Substitution of Formula (13) into Formula (6) yields $$W_{ii}^{23} = W_{ii}^{23} - \eta \cdot (y_1^3 - \bar{y}_1^3) \cdot y_1^3 \cdot (1 - y_1^3) \cdot y_i^2 \qquad (14)$$

The weights of connections $W_{i1}^{23}$, where i=1, 2, 3, are corrected with Formula (14).

Also, the following formula obtains:

$$\frac{\partial E_1}{\partial x_j^2} = \frac{\partial E_1}{\partial x_1^3} \cdot \frac{\partial x_1^3}{\partial x_j^2} \qquad (15)$$

Substitution of Formulas (2) and (3) into Formula (15) yields $$\frac{\partial E_1}{\partial x_j^2} = \frac{\partial E_1}{\partial x_1^3} \cdot \frac{\partial}{\partial x_j^2} \left( \sum_j W_{j1}^{23} \cdot y_j^2 \right) = \qquad (16)$$

$$\frac{\partial E_1}{\partial x_1^3} \cdot W_{j1}^{23} \cdot f'(x_j^2)$$

Formula (11) gives $$f'(x_j^2) = y_j^2 \cdot (1 - y_j^2) \qquad (17)$$

Substitution of Formulas (10), (12), and (17) into Formula (16) yields $$\frac{\partial E_1}{\partial x_j^2} = (y_1^3 - \bar{y}_1^3) \cdot y_1^3 \cdot (1 - y_1^3) \cdot \qquad (18)$$

$$y_j^2 \cdot (1 - y_j^2) \cdot W_{j1}^{23}$$

Setting k=1 in Formula (8) and substituting Formula (18) into Formula (8) yield $$\frac{\partial E_1}{\partial W_{ij}^{12}} = \frac{\partial E_1}{\partial x_j^2} \cdot y_i^1 = \qquad (19)$$

$$(y_1^3 - y_1^3) \cdot y_1^3 \cdot (1 - y_1^3) \cdot y_j^2 \cdot (1 - y_j^2) \cdot W_{j1}^{23} \cdot y_i^1$$

Substitution of Formula (19) into Formula (6) and setting of k=1 yield $$W_{ij}^{12} = W_{ij}^{12} - \eta \cdot (y_1^3 - y_1^3) \cdot y_1^3 \cdot \qquad (20)$$

$$(1 - y_1^3) \cdot y_j^2 \cdot (1 - y_j^2) \cdot y_i^1 \cdot W_{j1}^{23}$$

The values of the weights of connections $W_{i1}^{23}$, where i=1, 2, ..., n1, which have been corrected with Formula (14), are substituted into Formula (20). In this manner, the weights of connections $W_{ij}^{12}$, where i=1, 2, ..., n1 and j=1, 2, ..., n2, are corrected.

Theoretically, the weights of connections $W_{ij}^{k\,k+1}$ can be converged to predetermined values by using Formulas (14) and (20), using a sufficiently small learning coefficient $\eta$ and carrying out the learning operations very many times. However, if a sufficiently small learning coefficient $\eta$ is used, the speed with which the learning operations are effected will become low. If a very large learning coefficient $\eta$ is used, "vibration" will occur in the learning operations (i.e. the weights of connections do not converge to predetermined values). Therefore, actually, the vibration is prevented by employing an inertia term, which is expressed in Formula (21), in the calculations of the correction amounts for the weights of connections, and the learning coefficient $\eta$ is set to a slightly large value.

$$\Delta W_{ij}^{kk+1}(t+1) = \alpha \cdot \Delta W_{ij}^{kk+1}(t) + \qquad (21)$$

$$\eta \cdot \frac{\partial E_1}{\partial x_j^{k+1}} \cdot y_i^k$$

where $\alpha$ denotes the coefficient referred to as the inertia term, and $\Delta W_{ij}^{k\,k+1}(t)$ denotes the correction amount, which is used during the t'th learning operation and which is obtained by subtracting a weight of connection $W_{ij}^{k\,k+1}$, which has not been corrected, from a weight of connection $W_{ij}^{k\,k+1}$, which has been corrected. (Such an inertia term is described in, for example, "Learning internal representations by error propagation In Parallel Distributed Processing" by D. E. Rumelhart, G. E. Hinton and R. J. Williams, Volume 1, J. L. McClelland D. E. Rumelhart and The PDP Research Group, MIT Press, 1986b.)

By way of example, the inertia term $\alpha$ is set to 0.9, the learning coefficient $\eta$ is set to 0.25, and 200,000 times of corrections (learning operations) are carried out for each of the weights of corrections $W_{ij}^{k\,k+1}$. Thereafter, each of the weights of corrections $W_{ij}^{k\,k+1}$ is fixed at a final value. At the time at which the learning operations are completed, the two outputs $y_1^3$ and $y_2^3$ represents the appropriate sensitivity and the appropriate contrast during the final readout.

After the weights of connections $W_{ij}^{k\,k+1}$ are determined in the manner described above, they are compared with a predetermined threshold value Th. The weights of connections $W_{ij}^{k\,k+1}$, which satisfy the condition $$|W_{ij}^{k\,k+1}| < Th \qquad (22)$$

are set as $$W_{ij}^{k\,k+1} = 0 \qquad (23)$$

Specifically, connections, which satisfy the condition of Formula (22), are regarded as having null degree of connection. Such approximation has little adverse effect on the final outputs.

In cases where all of the weights of connections $W_{ij}^{k\,k+1}$ on the output side of each unit $u_i^k$ have been set as $W_{ij}^{k\,k+1} = 0$, the connections on the input side of said unit $u_i^k$ are unnecessary. Therefore, the weights of connections $W_{ij}^{k\,k+1}$ on the input side of said unit $u_i^k$ are also set as $W_{ij}^{k\,k+1} = 0$. For example, in cases where the weights of connections $W_{31}^{23}$ and $W_{32}^{23}$ on the output side of a unit $u_3^2$ have been set as $W_{31}^{23}, W_{32}^{23} = 0$ as a result of the operations carried out with Formulas (22) and (23), the weights of connections $W_{13}^{12}, W_{23}^{12}$, and $W_{33}^{12}$ on the input side of the unit $u_3^2$ are also set as being 0.

Figure 1B:
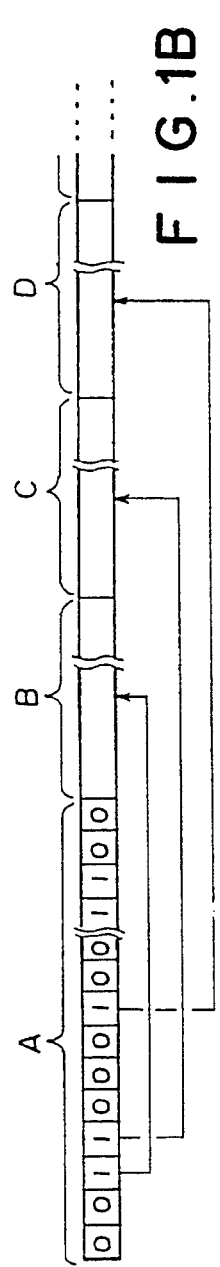

FIGS. 1A and 1B are explanatory views showing formats in which the information concerning neural networks is stored in the computer system 40.

By way of example, the formats shown in FIGS. 1A and 1B correspond to neural networks for determining the read-out conditions for the final readouts from the X-ray image of the shoulder shown in FIG. 3A and the X-ray image of the head shown in FIG. 3B, respectively. In each of FIGS. 1A and 1B, information concerning a table is stored in a region A. The table indicates whether the weights of connections $W_{ij}^{k\,k+1}$ in each neural network have been or have not been set as being 0 by the operations carried out with Formulas (22) and (23). In each of regions B, C, D, ..., the information representing the value of a weight of connection $W_{ij}^{k\,k+1}$, which was set as being not equal to 0 by the operations carried out with Formulas (22) and (23), is stored. Specifically, the region A is constituted of a plurality of flags. Each flag corresponds to one of the connections constituting a single neural network. In the region A, the flags are set to 1 for the connections, the weights $W_{ij}^{k\,k+1}$ of which were set as being not equal to 0. The information representing the values of the weights of the connections, for which the flags are set to 1, is sequentially stored in the regions B, C, D, ... In the format described above, the information concerning the neural network is stored. As for the connections, the weights $W_{ij}^{k\,k+1}$ of which were set as being 0, no information is stored in the storage means of the computer system 40. Therefore, the storage capacity of the storage means can be kept small. Also, the information representing the values of the weights of connections $W_{ij}^{k\,k+1}$, which were set as being not equal to 0, is stored together with the corresponding table (which table is stored in the region A). Therefore, the information concerning the neural network can be stored in a well arranged format, which is common to a plurality of neural networks.

The number of layers of the neural network is not limited to three. Also, no limitation is imposed on the number of the units of each layer. The number of the units of each layer may be determined in accordance with the number of the picture elements represented by the preliminary read-out image signal SP, which is fed into the neural network, the accuracy, with which the read-out conditions for the final readout are to be obtained, or the like.

The voltage applied to the photomultiplier 21' of the final read-out means 100', the amplification factor of the logarithmic amplifier 26', and the like, are controlled in accordance with the read-out conditions for the final readout, which have been adjusted by the neural network. The final readout is carried out under the controlled conditions.

In the embodiment described above, the neural network is utilized to determine the read-out conditions, under which an X-ray image is to be read out during the final readout. However, regardless of what kind of information is to be fed into a neural network and what kind of information is to be fed out of the neural network, the apparatus for storing factors for a multi-layer neural network in accordance with the present invention is widely applicable when a plurality of pieces of information representing the factors for neural networks are stored.

As described above, the apparatus for storing factors for a multi-layer neural network in accordance with the present invention is provided with the means for classifying connections, which classifies the connections as having a high degree of connection or having a low degree of connection by comparing the connection factors with a predetermined threshold value. In cases where all of the connections on the output side of each of the neurons have been classified as having a low degree of connection, the connections on the input side of each said neuron are classified as having a low degree of connection. The apparatus for storing factors for a multi-layer neural network in accordance with the present invention is also provided with the storage means for storing information representing the connection factors of the connections, which have been classified as having a high degree of connection, and information concerning the corresponding table, which indicates whether the connections between the neurons have been classified as having a high degree of connection or having a low degree of connection by the means for classifying connections. Therefore, the storage capacity of the storage means can be kept small. Also, information representing the factors for a large number of neural networks can be stored in an appropriately arranged form. Therefore, by using the stored information concerning a large number of neural networks, operations for obtaining desired outputs can be carried out efficiently.

What is claimed is:

1. An apparatus for storing weight factors for connections between neurons in a multi-layer neural network which is supplied with a plurality of input signals, wherein information representing connection weight factors is stored which represents strengths of connections between neurons of a multi-layer neural network including an input layer, at least a single intermediate layer, and an output layer, each of the input layer, the intermediate layer, and the output layer being composed of at least a single neuron, comprising:

i) a means for classifying each of said connections between said neurons of said multi-layer neural network, which classifies said connections between said neurons as having a high degree of connection or having a low degree of connection by comparing said connection weight factors with a single predetermined threshold value, and which classifies said connections between said neurons on the input side of each of said neurons as having a low degree of connection in cases where all of said connections on the output side of each of said neurons have been classified as having a low degree of connection, said means for classifying connections providing classifications accordingly, and ii) a storage means for storing information representing the connection weight factors of said connections between said neurons, which have been classified as having a high degree of connection, said storage means further storing said classifications in a table.

* * * * *